(12) United States Patent
Siler et al.

(10) Patent No.: US 11,617,362 B2
(45) Date of Patent: Apr. 4, 2023

(54) PEST CONTROL SYSTEM AND METHOD OF OPERATING SAME

(71) Applicant: DOW AGROSCIENCES LLC, Indianapolis, IN (US)

(72) Inventors: Christopher Siler, Hemlock, MI (US); Joseph Langmaid, Caro, MI (US); Piyush Soni, Midland, MI (US); Neil Spomer, Carmel, IN (US); Michael K. Hanson, Whitestown, IN (US)

(73) Assignee: DOW AGROSCIENCES LLC, Indianapolis, IN (US)

( * ) Notice: Subject to any disclaimer, the term of this patent is extended or adjusted under 35 U.S.C. 154(b) by 226 days.

(21) Appl. No.: 16/757,476

(22) PCT Filed: Oct. 8, 2018

(86) PCT No.: PCT/US2018/054843
§ 371 (c)(1),
(2) Date: Apr. 20, 2020

(87) PCT Pub. No.: WO2019/079053
PCT Pub. Date: Apr. 25, 2019

(65) Prior Publication Data
US 2021/0185998 A1 Jun. 24, 2021

Related U.S. Application Data
(60) Provisional application No. 62/575,222, filed on Oct. 20, 2017.

(51) Int. Cl.
*A01M 23/16* (2006.01)
*A01M 23/38* (2006.01)

(52) U.S. Cl.
CPC ............ *A01M 23/16* (2013.01); *A01M 23/38* (2013.01)

(58) Field of Classification Search
CPC ...... A01M 23/16; A01M 23/38; A01M 23/00; A01M 23/24; A01M 23/245; A01M 23/30
See application file for complete search history.

(56) References Cited

U.S. PATENT DOCUMENTS

| | | | |
|---|---|---|---|
| 6,098,334 A * | 8/2000 | Stouffer | A01M 23/18 43/61 |
| 6,543,179 B1 | 4/2003 | Lee | |
| 8,793,929 B1 * | 8/2014 | Walsh | A01M 25/004 43/131 |

(Continued)

FOREIGN PATENT DOCUMENTS

| | | | | |
|---|---|---|---|---|
| WO | 2016073429 A1 | 5/2016 | | |
| WO | WO-2016073429 A1 * | 5/2016 | ............ | A01M 1/026 |

OTHER PUBLICATIONS

PCT International Search Report and Written Opinion for PCT/US2018/054843, dated Jan. 2, 2019, 10 pages.

*Primary Examiner* — Peter M Poon
*Assistant Examiner* — Carly W. Lynch
(74) *Attorney, Agent, or Firm* — Barnes & Thornburg LLP

(57) ABSTRACT

The present disclosure relates to devices for controlling pests, and, more specifically, to devices for monitoring and communicating the presence of pests, and eliminating pests. The pest control system comprises a frame configured to be removeably positioned in a pest control station, a panel pivotally coupled to the frame, and pest control device positioned in the frame.

11 Claims, 12 Drawing Sheets

(56) References Cited

U.S. PATENT DOCUMENTS

| | | |
|---|---|---|
| 2002/0167409 A1 | 11/2002 | Cristofori et al. |
| 2005/0102887 A1 | 5/2005 | Lang et al. |
| 2006/0156617 A1* | 7/2006 | Hale ................... A01M 23/30 43/81 |
| 2017/0035041 A1 | 2/2017 | Othon |

* cited by examiner

PEST CONTROL SYSTEM AND METHOD OF OPERATING SAME

CROSS-REFERENCE TO RELATED APPLICATIONS

This application is a national stage entry under 35 U.S.C. § 371 of PCT International Stage Patent Application No. PCT/US2018/054843, filed Oct. 8, 2018, which claims the benefit under 35 U.S.C. § 119(e) of U.S. Provisional Patent Application No. 62/575,222, filed Oct. 20, 2017, the entire disclosures of which are incorporated herein by reference. Cross-reference is made to U.S. patent application Ser. No. 15/524,444, which was filed on May 4, 2017 and is expressly incorporated herein by reference.

TECHNICAL FIELD

The present disclosure relates generally to devices for controlling pests, and, more specifically, to devices for monitoring and communicating the presence of pests, and eliminating pests.

BACKGROUND

The detection and removal of pests from areas occupied by humans, livestock, crops, and other pest-attracting areas has long been a challenge. Pests of frequent concern include various types of insects and rodents. Subterranean termites are a particularly troublesome type of pest with the potential to cause severe damage to wooden structures. Likewise, other insects, such as bedbugs, are problematic. Additionally, rodent control is often challenging. Various schemes have been proposed to eliminate these and certain other harmful pests. Some of those schemes use one or more stations, which must be periodically checked by service personnel. Similarly, rodent traps in residential and commercial settings need to be routinely checked by service personnel.

Exemplary pest control systems including a sensor array operable to generate electrical output signals indicative of the presence of a pest is shown in International Publication No. WO2016/073429, which is expressly incorporated herein by reference.

SUMMARY

According to one aspect of the disclosure, a pest control system is disclosed. The pest control system comprises a frame configured to be removeably positioned in a pest control station, a panel pivotally coupled to the frame, and pest control device positioned in the frame. The panel is moveable relative to the frame between a first position and a second position.

The pest control device includes an outer casing, a support plate pivotally coupled to the outer casing, an orientation sensor positioned in the outer casing, and an electronic controller operable to receive the electrical output signals. The orientation sensor is operable to generate a plurality of electrical output signals indicative of the orientation of the pest control device.

When the panel is in the first position, the support plate is maintained in a support position such that the pest control device is in a first orientation, and when the panel is in the second position, the support plate is released from the support position and the pest control device is in a second orientation different from the first orientation.

The electronic controller is operable to detect movement of the pest control device from the first orientation to the second orientation based on the electrical output signals of the orientation sensor and record an event indicative of a presence of a pest when the electronic controller detects the movement of the pest control device from the first orientation to the second orientation.

In some embodiments, the system may further comprise a housing having a compartment sized to receive the frame, the panel, and the pest control device, and an opening sized to permit a pest to enter the compartment.

In some embodiments, the frame may include a side wall positioned between the opening in the housing and the pest control device, and an aperture that is defined in the side wall and is sized to permit the pest to pass through the side wall. The panel may be positioned in the aperture and extends generally parallel to the side wall when the panel is in the first position.

In some embodiments, the panel may be angled relative to the side wall when the panel is in the second position.

In some embodiments, the pest control device may be secured to the frame. Additionally, in some embodiments, the frame may include a vertically-extending post, and the pest control device may include a slot sized to receive the vertically-extending post. In some embodiments, the frame may include a bracket positioned over the pest control device.

In some embodiments, the support plate may include a leg that is pivotally coupled to the outer casing and a foot extending outwardly from the leg. The support plate may be moveable from the support position in which the foot is positioned in a slot at least partially defined by the panel. In some embodiments, the slot may be defined between the panel and the frame.

In some embodiments, the frame may further include a base wall and a side wall extending upwardly from the base wall, and the slot may be defined between the panel and the base wall.

In some embodiments, an aperture may be defined in the side wall of the frame and may be sized to permit the pest to pass through the side wall, and the panel may be positioned in the aperture and extends parallel to the side wall when the panel is in the first position.

In some embodiments, the panel may be angled relative to the side wall when the panel is in the second position.

In some embodiments, the panel may cover the aperture of the frame when the first position and the aperture may be at least partially uncovered when the panel is in the second position.

In some embodiments, the pest control device may further include a transceiver operable to transmit a signal after the controller records the event indicative of the presence of the pest.

According to another aspect, a method of monitoring for pests is disclosed. The method comprises engaging a support plate of a pest control device with a moveable panel positioned to place the support plate in a support position, determining an initial orientation of the pest control device with the support plate in the support position, monitoring the orientation of the pest control device, determining a pest condition of the pest control device based on the orientation of the pest control device, and transmitting the pest condition to a remote system to determine a status of the pest control device.

In some embodiments, the method may further comprise recording a plurality of orientation values from an orientation sensor of the pest control device. Each orientation value may comprise (x, y, z) coordinates corresponding to an orientation of the pest control device. The method may also include determining whether the pest control device is stable based on the plurality of orientation values, and determining the initial orientation of the pest control device may include determining the initial orientation of the pest control device when the pest control device is stable.

In some embodiments, recording the plurality of orientation values may further comprise recording each orientation value from the orientation sensor after a predetermined time interval has lapsed until a predetermined number of the orientation values are recorded.

In some embodiments, the predetermined number of the orientation values may be at least 8 orientation values.

In some embodiments, determining whether the pest control device is stable based on the plurality of orientation values may comprise determining maximum orientation values and minimum orientation values from the plurality of orientation values for each of the (x, y, z) coordinates, determining differences between the maximum orientation values and the minimum orientation values for each of the (x, y, z) coordinates of the plurality of orientation values, determining whether all of the differences are less than or equal to a first set of predetermined thresholds, determining average orientation value for each of the (x, y, z) coordinates of the plurality of orientation values when all of the differences are less than or equal to the first set of predetermined thresholds, and storing the (x, y, z) coordinates of the average orientation value with a new stable orientation value to indicate that the pest control device is stable.

In some embodiments, determining whether the pest control device is stable based on the plurality of orientation values may comprise determining maximum orientation values and minimum orientation values from the plurality of orientation values for each of the (x, y, z) coordinates, determining differences between the maximum orientation values and the minimum orientation values for each of the (x, y, z) coordinates, determining whether a sum of the differences is less than or equal to a first predetermined threshold, determining average orientation values for each of the (x, y, z) coordinates from the plurality of orientation values when the sum of the differences is less than or equal to the first predetermined threshold, and updating the average orientation values to a new stable orientation coordinates.

In some embodiments, determining an orientation of the pest control device when the pest control device is stable may comprise identifying a (x, y, z) coordinates of a previous stable orientation value, determining a deflection angle of the pest control device using the (x, y, z) coordinates of the new stable orientation value, determining the deflection angle exceeds a second predetermined threshold, updating the pest condition when the second predetermined threshold is exceeded, and updating the previous stable orientation value with the new stable orientation value.

In some embodiments, calculating the deflection angle of the pest control device may include using the following equation:

$$DeflectionAngle = \cos^{-1}\left(\frac{(A_X * B_X) + (A_Y * B_Y) + (A_Z * B_Z)}{\sqrt{(A_X^2 + A_Y^2 + A_Z^2) * (B_X^2 + B_Y^2 + B_Z^2)}}\right)$$

wherein "$A_x$", "$A_y$", "$A_z$" are the (x, y, z) coordinates of new stable orientation value, and "$B_x$", "$B_y$", "$B_z$" are the (x, y, z) coordinates of previous stable orientation value.

According to another aspect, a pest control system comprises a frame configured to be removeably positioned in a pest control station housing, a panel pivotally coupled to the frame, the panel being moveable relative to the frame between a first position and a second position, and a pest control device positioned in the frame. The pest control device includes an outer casing, a support plate pivotally coupled to the outer casing, and an orientation sensor positioned in the outer casing. The orientation sensor is operable to generate a plurality of electrical output signals indicative of the orientation of the pest control device.

When the panel is in the first position, the support plate is maintained in a support position such that the pest control device is in a first orientation, and when the panel is in the second position, the support plate is released from the support position and the pest control device is in a second orientation different from the first orientation.

According to another aspect, a pest control system comprises a frame, a panel pivotally coupled to the frame, and a pest control device coupled to the panel. The panel is moveable relative to the frame between a first position and a second position. The pest control device includes an outer casing, an orientation sensor positioned in the outer casing, and an electronic controller operable to receive the electrical output signals. The orientation sensor is operable to generate a plurality of electrical output signals indicative of the orientation of the pest control device. When the panel is in the first position, the pest control device is in a first orientation, and when the panel is in the second position, the pest control device is in a second orientation different from the first orientation. The electronic controller is operable to detect movement of the pest control device from the first orientation to the second orientation based on the electrical output signals of the orientation sensor and record an event indicative of a presence of a pest when the electronic controller detects the movement of the pest control device from the first orientation to the second orientation.

BRIEF DESCRIPTION OF THE DRAWINGS

The detailed description particularly refers to the following figures, in which.

DETAILED DESCRIPTION OF THE DRAWINGS

Figure 1:
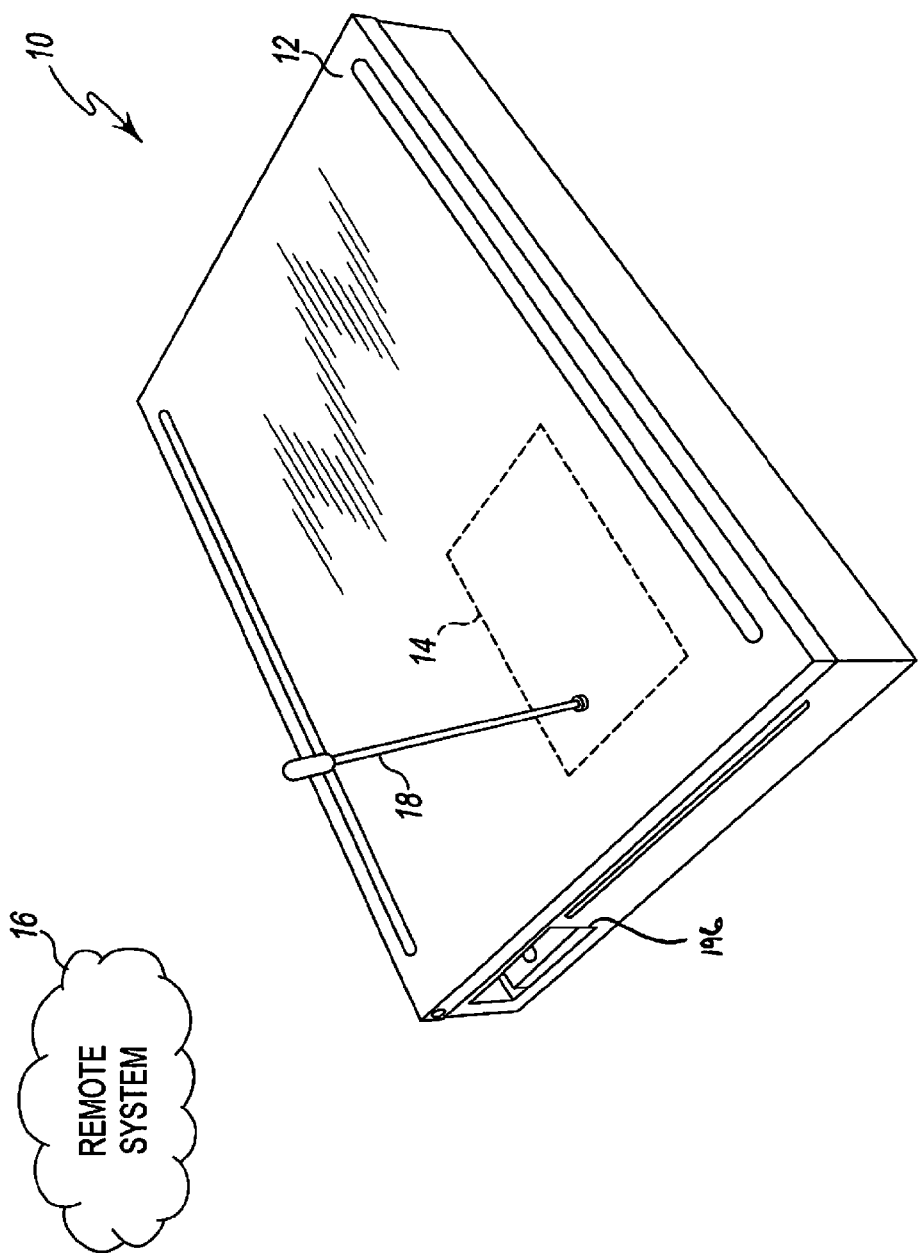
FIG. 1 is a perspective view of a pest control system.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

Referring now to FIG. 1, a pest control system including a pest control station 10 is shown. In the illustrative embodiment, the pest control station 10 is a rodent control station 10 configured to monitor a particular location. The station 10 includes a housing 12 configured to catch pests such as rodents and a pest control device 14 positioned in the housing 12. As described in greater detail below, the pest control device 14 is configured to detect the presence of rodents in the station 10 and report that presence to a remote system 16 wirelessly via an antenna 18. In other embodiments, the pest control device 14 may also include a pest extermination device that actively exterminates the rodent.

The control station may also be configured to monitor for the presence of other pests such as, for example, termites, bed bugs, other insects, or other pests of concern. In those embodiments, the control station may include a pest-specific sensor. It should be appreciated that in other embodiments the control station may include an open housing to cover the pest control device 14. In still other embodiments, the control station may not include any housing.

It should be appreciated that the station 10 may include bait in the form of a pest-consumable material. In some embodiments, the pest-consumable material may include a rodenticide. In other embodiments, the bait may be a lure or other pest-attracting material. In still other embodiments, the station may not include bait.

Figure 2:
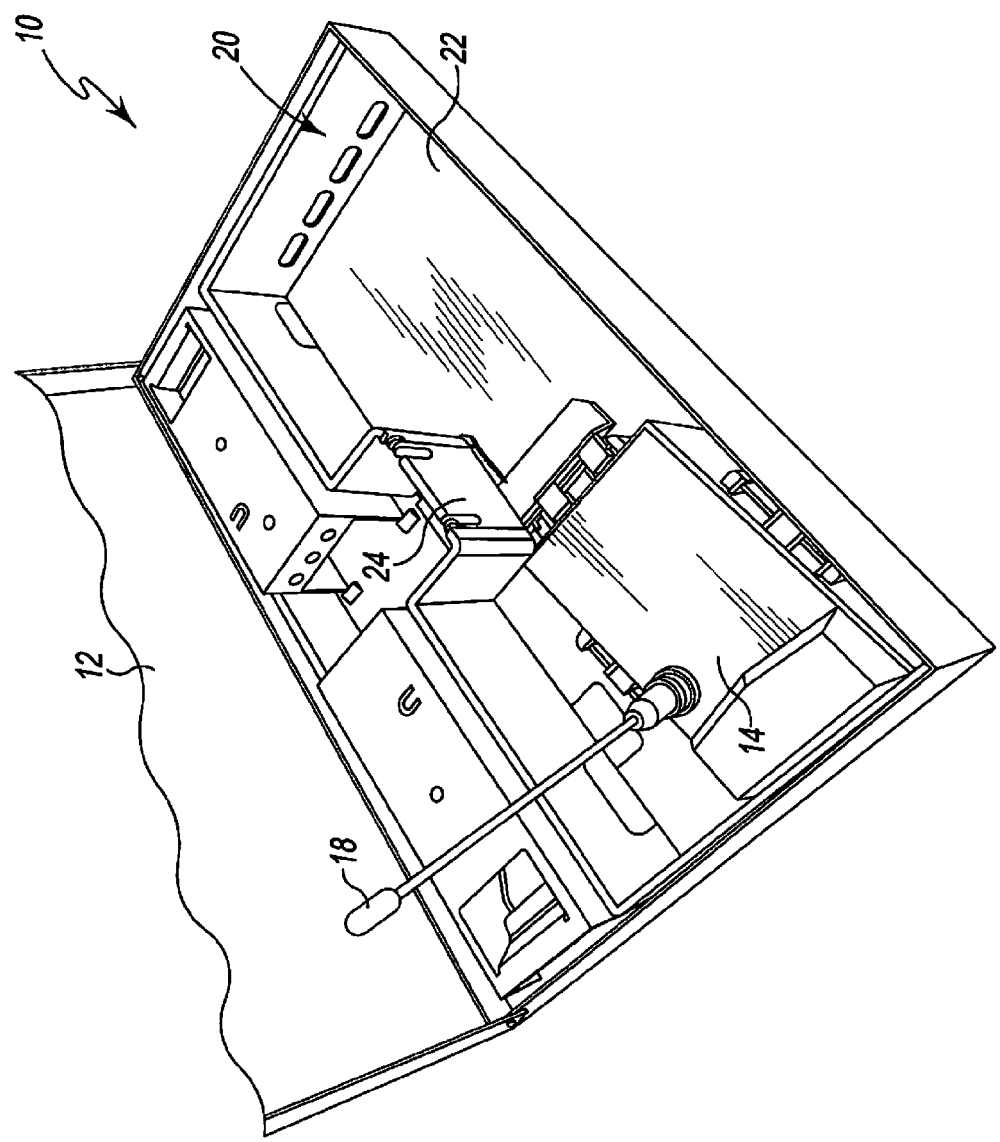
FIG. 2 is a perspective view of a pest control station of the system of FIG. 1 showing a modular tray that includes a pest control device and a frame.

Referring now to FIG. 2, the control station 10 includes a modular tray 20 sized to be positioned in the housing 12. The tray 20 includes a frame 22 that supports the pest control device 14 and a movable panel 24 that is coupled to the frame 22. As described in greater detail below, the station housing 12 lacks any detection and remote monitoring capabilities such that a pest control operator must physically inspect the housing 12 to determine if rodents are present. The tray 20 is configured to be inserted into the housing 12 with the pest control device 14 to provide detection and remote monitoring capabilities so that the pest control operator may be informed of the presence of rodents without having to physically inspect the housing 12. It should be appreciated that in other embodiments the pest control station may include only the modular tray 20 and the housing 12 may be omitted.

Figure 3:
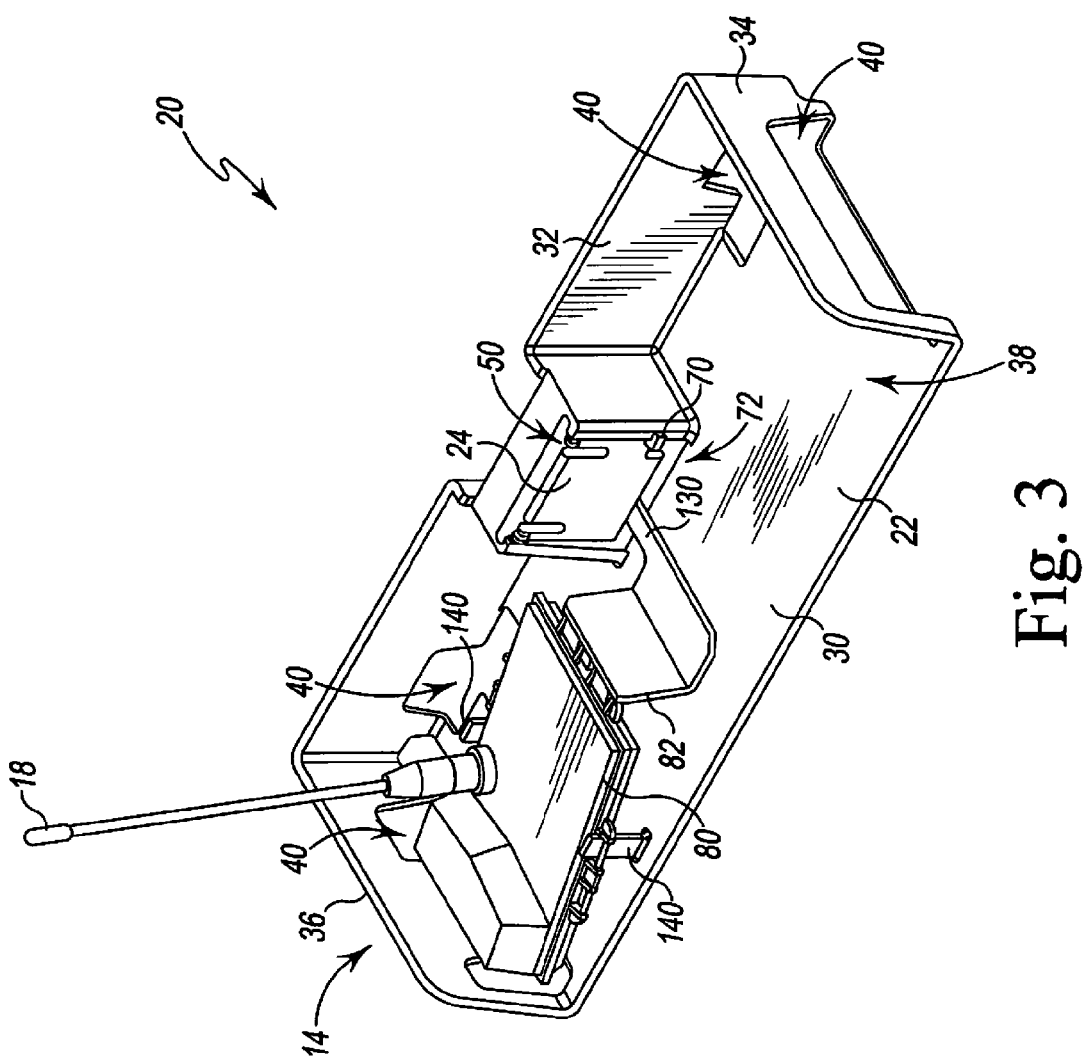
FIG. 3 is a perspective view of the pest control device and the frame of the modular tray of FIG. 2.

As shown in FIG. 3, the frame 22 of the tray 20 includes a base wall 30 and a side wall 32 extending upwardly from the base wall 30. The frame 22 also includes a pair of end walls 34, 36 extending upwardly from each longitudinal end of the base wall 30. The walls 30, 32, 34, 36 cooperate to define a chamber 38 in the frame 22 that is sized to receive the pest control device 14. A plurality of vents 40 are defined in the walls 30, 32, 34, 36 to facilitate the passage of air into and out of the chamber 38. It should be appreciated that in other embodiments the frame 22 may include fewer or additional vents or the vents may be take on other sizes or shapes. In the illustrative embodiment, each vent 40 is sized permit the passage of air but prevent a rodent or other pest from exiting the chamber 38 through any of the vents 40.

In the illustrative embodiment, the frame 22 is formed as a single monolithic component from a plastic material. It should be appreciated that in other embodiments the frame may be an assembly formed from multiple components made from one or more materials. In other embodiments, the frame may be formed from a metallic material such as, for example, stainless steel.

Figure 4:
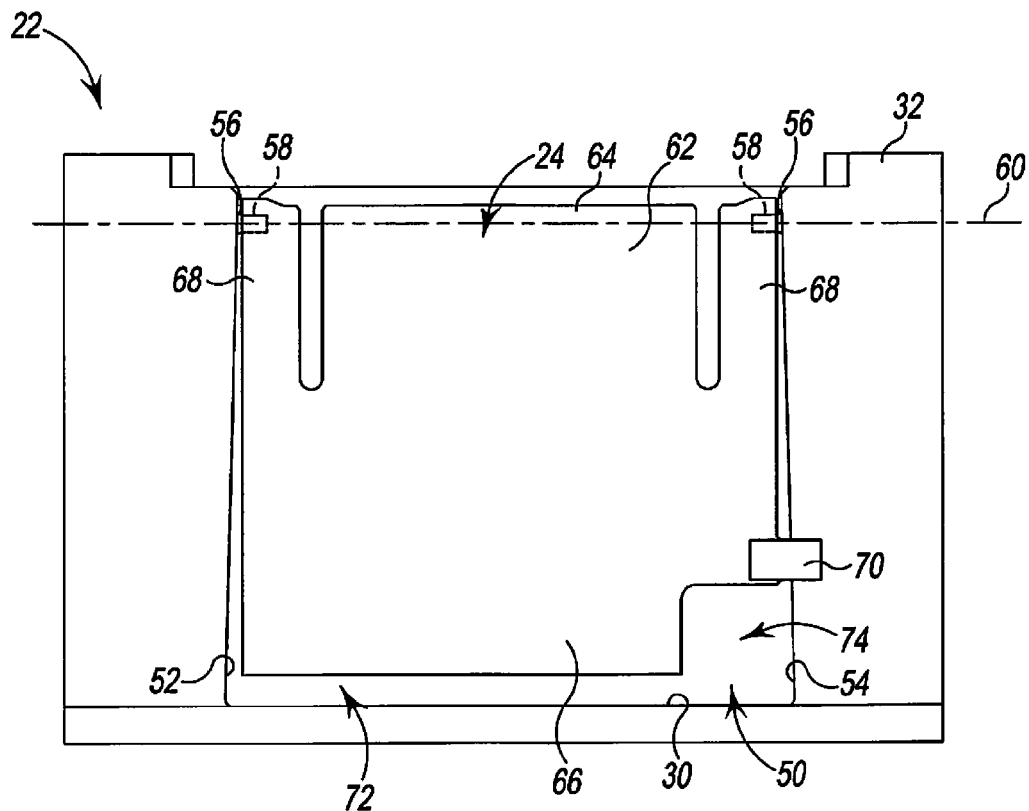
FIG. 4 is a side elevation view of the frame of FIGS. 2-3 showing a moveable panel in a closed position.
Figure 5:
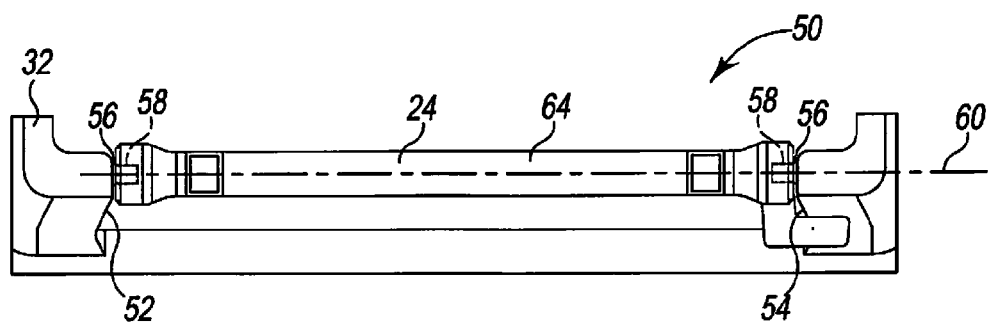
FIG. 5 is a plan view of the moveable panel and the frame in the position of FIG. 4.

As shown in FIGS. 3-5, the frame 22 also includes an aperture 50 that is defined in the side wall 32. As shown in FIG. 4, the aperture 50 is defined between a pair of end surfaces 52, 54 of the side wall 32. In illustrative embodiment, the aperture 50 is sized to permit the passage of rodents into the chamber 38. The aperture 50 has a trapezoidal shape in the illustrative embodiment; it should be appreciated that in other embodiments the aperture may take other geometrical forms such as, for example, ovals, circles, squares, or rectangles that are sized to permit the passage of rodents through the aperture.

As described above, the tray 20 also includes a movable panel 24 that is coupled to the frame 22. As shown in FIGS. 4-5, the frame 22 includes a pair of pins or pegs 56 that extend outwardly from the end surfaces 52, 54. Each peg 56 is received in a corresponding bore 58 defined in the movable panel 24 to couple the panel 24 to the frame 22. The pegs 56 cooperate to define a pivot axis 60 about which the panel 24 may pivot. In the illustrative embodiment, the movable panel 24 may be pivoted between a number of positions, including the closed position shown in FIGS. 4 and 5, in which the movable panel 24 is positioned in, and substantially fills, the aperture 50, and the open position shown in FIG. 10, in which the panel 24 is angled out from the aperture 50 and extends into the chamber 38. As described in greater detail below, the movable panel 24 blocks entry into the chamber 38 of the tray 20 when the panel 24 is in the closed position, and a rodent or other pest must push open the panel 24 to gain access to the chamber 38.

The panel 24 has a main plate 62 that extends from an upper end 64 to a lower end 66. A pair of cantilevered arms 68 extend outwardly from the main plate 62. In the illustrative embodiment, one bore 58 is defined in the upper end of each cantilevered arm 68. The panel 24 also includes a flange 70 that extends outwardly from the main plate 62 to engage the side wall 32 of the frame 22. As described in greater detail below, the flange 70 is configured to prevent the panel 24 from pivoting outward from the frame 22 away from the chamber 38.

As shown in FIG. 4, the lower end 66 of the main plate 62 is spaced apart from the base wall 30 of the frame 22 such that an elongated slot 72 is defined below the panel 24. The elongated slot 72 extends the entire width of the panel 24. In the illustrative embodiment, the elongated slot 72 extends into a recess 74 defined in the lower end 66 of the panel 24. As shown in FIG. 4, the recess 74 is positioned below the flange 70 on one side of the panel 24. The recess 74 is square shaped in the illustrative embodiment.

In the illustrative embodiment, the panel 24 is formed as a single monolithic component from a plastic material. It should be appreciated that in other embodiments the panel may be an assembly formed from multiple components made from one or more materials. In other embodiments, the panel may be formed from a metallic material such as, for example, stainless steel. In other embodiments, the panel may be formed integrally with the frame.

As described above, the station 10 also includes a pest control device 14 that is positioned in the chamber 38 of the frame 22. In the illustrative embodiment, the pest control device 14 includes an outer casing 80 and a hinged support plate 82 attached to the casing 80. The outer casing 80 houses and protects the electrical components 84 (see FIG. 7) from environmental factors, including water ingress, dust, dirt, leaves, humidity, and waste. The outer casing 80 is generally rectangular-shaped and has two short end walls 86, 88, respectively, and two long side walls 90, 92. The antenna 18 is connected at its base to a top surface 94 of the outer casing 80 via a connector 96 to permit the device 14 to communicate with the system 16. In that way, the pest control device 14 may be disconnected from the antenna 18. In other embodiments, the pest control device 14 and the antenna 18 may be formed as a single unit. It should also be appreciated that in other embodiments the antenna 18 may be a low-profile helical antenna, hardware circuit in the pest control device 14, or other type of antenna capable of transmitting and receiving signals between the pest control device 14 and the system 16.

The outer casing 80 includes a plurality of mounting arms 100 that are positioned along the walls 86, 90, 92. Each mounting arm 100 is a possible attachment point for the support plate 82. Each arm 100 includes a plurality of posts 104, 106, 108 that extend outwardly from each of the walls 86, 90, 92. A rod 110 extends between the posts 104, 106, 108. In the illustrative embodiment, the rod 110 has a cylindrical cross-section, but it should be appreciated that in other embodiments it may have a different cross-section.

Figure 6:
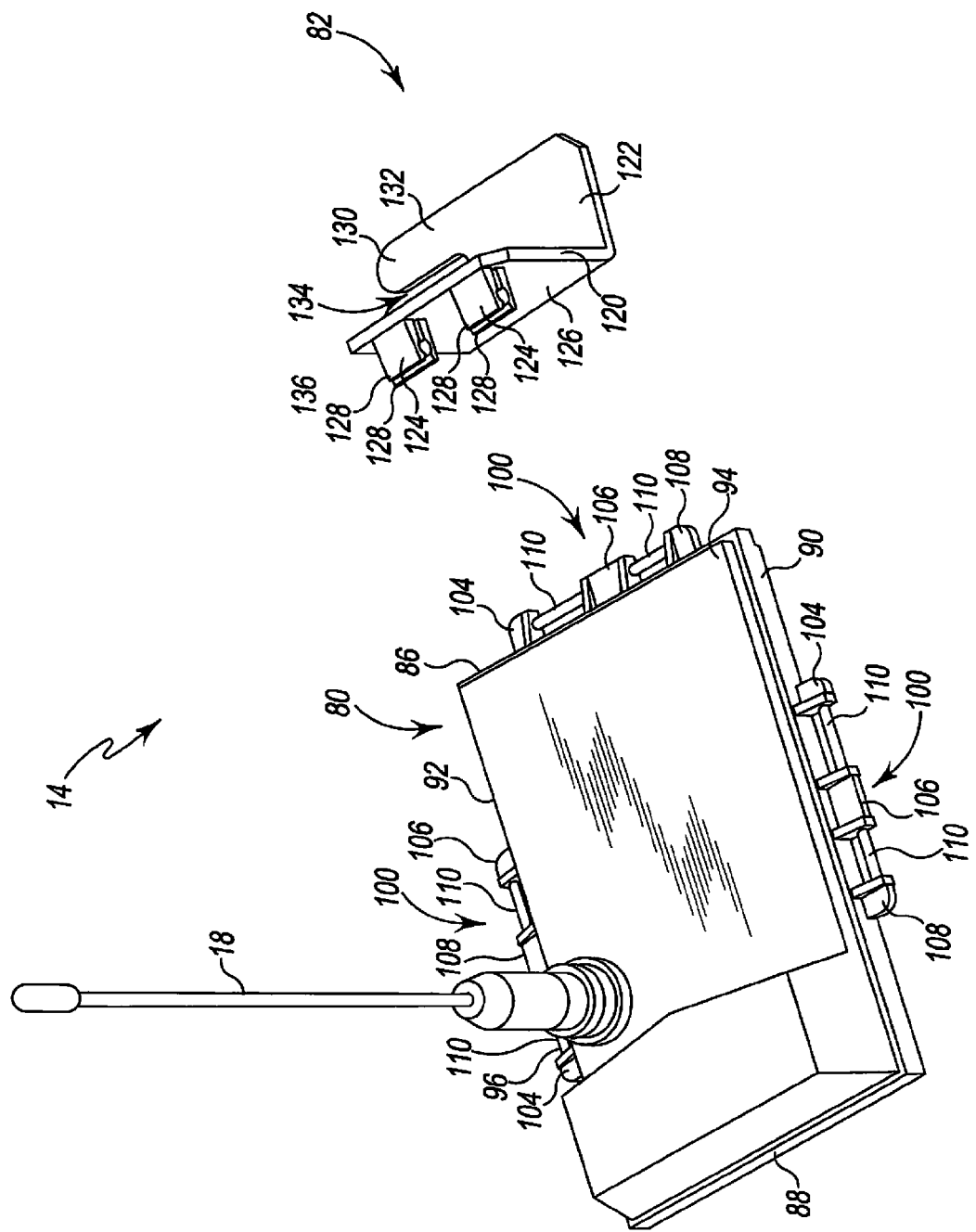
FIG. 6 is an exploded perspective view of the pest control device of FIGS. 1-3.

As shown in FIG. 6, the support plate 82 includes a rear panel or leg 120 that is connected to a foot panel 122. The leg 120 has a pair of clips 124 that extend outwardly from its back surface 126. Each clip 124 includes teeth 128 that engage the rod 110 of a mounting arm 100 to secure the support plate 82 to the outer casing 80 In the illustrative embodiment, each clip 124 is configured to engage the rod 110 such that the support plate 82 is hinged to the pest control device 14 and may pivot relative to the outer casing 80.

The foot panel 122 includes an engagement tab 130 that is sized to be positioned in the elongated slot 72 defined between the panel 24 and the frame 22. An upper surface 132 of the tab 130 is configured to engage the lower end 66 of the panel 24 and a lower surface 134 positioned opposite the surface 132. In the illustrative embodiment, the surfaces 132, 134 are substantially smooth surfaces. In other embodiments, the surfaces may include grooves, ribs, or other features to grip the panel 24 and/or the base wall 30 of the frame 22.

It should be appreciated that in other embodiments the support plate 82 may include a pin that extends outwardly from the back surface 126 of the leg 120 near the clip 124. In such embodiments, the pin may be configured to engage the outer casing 80 to prevent the support plate 82 from rotating beyond a predetermined orientation.

The outer casing 80 and the support plate 82 are each formed from a hard, durable plastic. In other embodiments, the casing 80 and support plate 82 may be formed from any environmentally resistant material.

Figure 12:
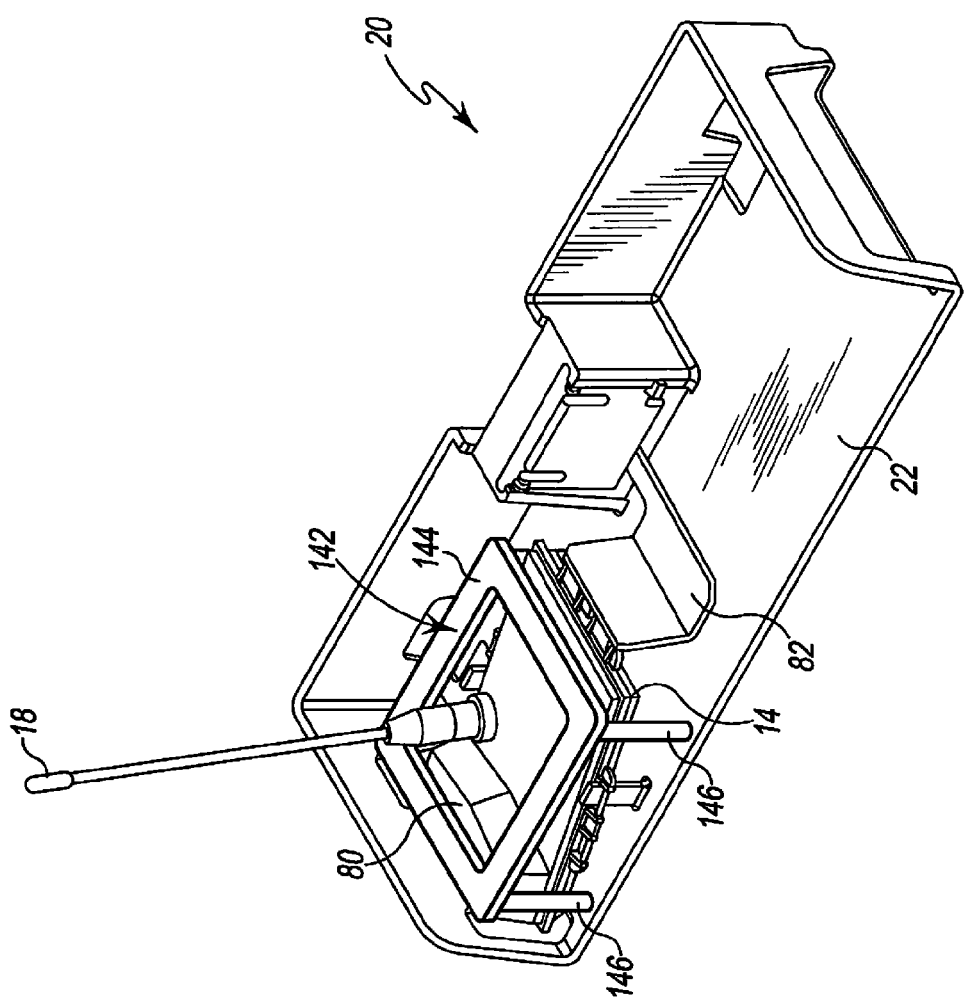
FIG. 12 is a perspective view of another embodiment of a modular tray of the pest control system.

Returning to FIG. 6, the frame 22 also includes a pair of support posts 140 that extend upwardly from the base wall 30. The posts 140 define a space sized to receive the outer casing 80 of the pest control device 14. Each post 140 is sized to be positioned in one of the slots 150 defined between the rods 110, posts 104, 106, 108, and walls 90, 92 of the outer casing 80. In that way, the posts 140 couple the pest control device 14 to the frame 22. In other embodiments, such as, for example, the embodiment shown in FIG. 12, the tray 20 may include a bracket 142 sized to be positioned over the pest control device 14. As shown in FIG. 12, the bracket 142 may include an upper plate 144 that is secured to the frame 22 via a number of posts 146.

Figure 7:
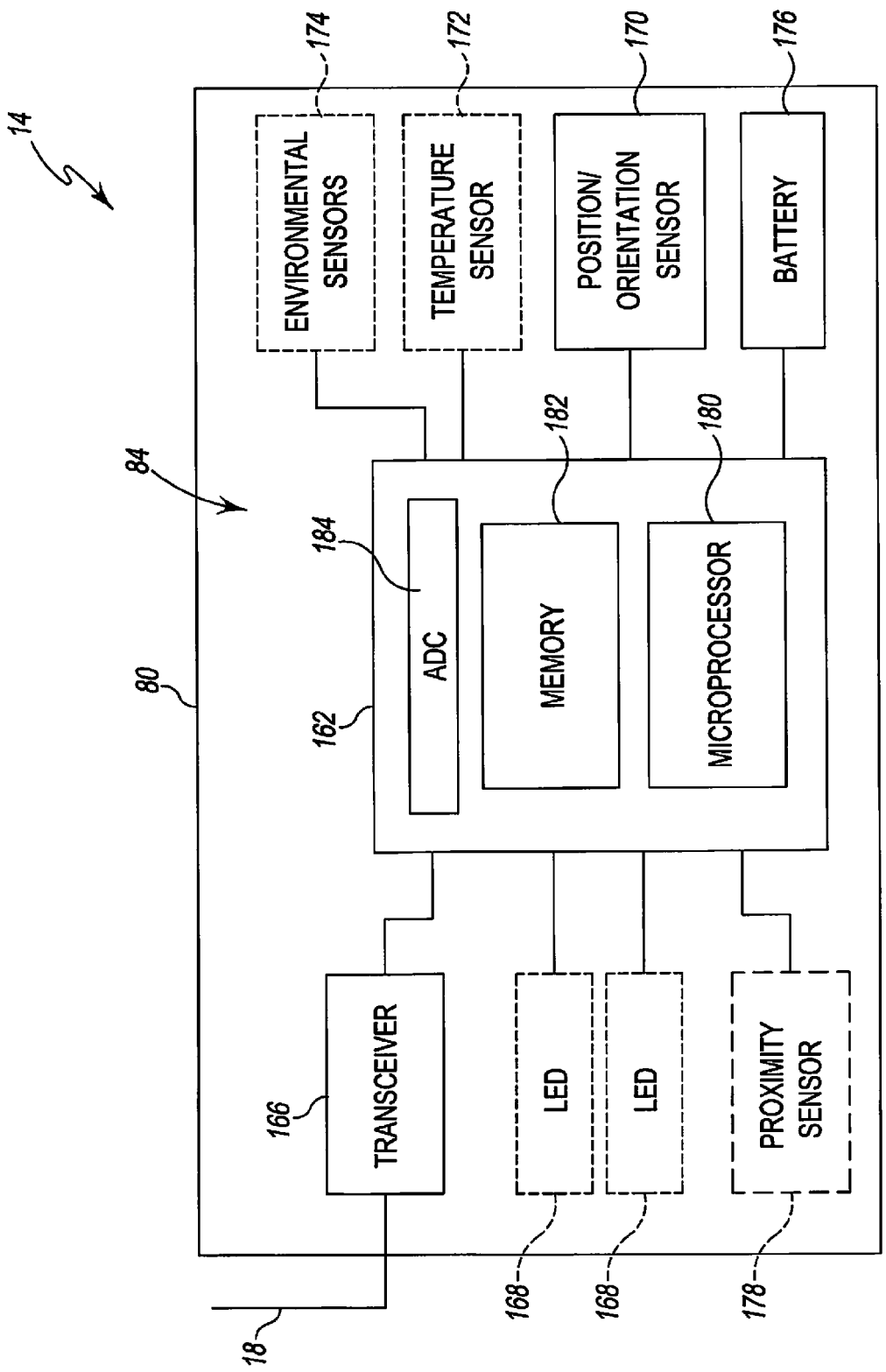
FIG. 7 is a block diagram schematic of the pest control device of FIG. 1-3.

Referring now to FIG. 7, the electrical components 84 of the pest control device 14 are shown in a simplified block diagram. In the illustrative embodiment, the electrical components 84 include circuits and circuitry as well as electronic devices such as an electronic control unit (ECU) or "electronic controller" 162, which is configured to control the operation of the pest control device 14. The ECU 162 is illustratively embodied as a lower-power microcontroller device such as a MSP430 Series microcontroller, which is commercially available from Texas Instruments of Dallas, Tex. In other embodiments, other commercially-available microcontrollers, discrete processing circuits (e.g., a collection of logic devices), general purpose integrated circuit(s), and/or application specific integrated circuit(s) (i.e., ASICs) may be used to control the operation of the pest control device 14. In the illustrative embodiment, the other electrical components 84, including the position sensor 170, are electrically connected with the ECU 162 via a number of communication links 164 such as printed circuit board traces, wires, cables, and the like.

The electrical components 84 include a transceiver array 166 that is connected to the antenna 18 via the connector 96. The transceiver array 166 is configured to transmit and/or receive data for the ECU 162 using a radio frequency over a local area network (LAN). In the illustrative embodiment, the transceiver array 166 is capable of communication in the unlicensed 915 MHz Industrial, Scientific, and Medical (ISM) frequency band. As such, the transceiver array 166 may include any number of circuits and electronic devices (e.g., an RF transceiver and duplexer). In the illustrative embodiment, the RF transceiver of the array 166 is a low power transceiver such as, for example, a Simplelink CC1200 RF Transceiver, which is commercially available from Texas Instruments of Dallas, Tex. It should be appreciated that in other embodiments the transceiver array may be configured to transmit and receive at other frequencies and/or by other techniques including, for example, via a cellular network. In other embodiments, the pest sensor may include a separate transmitter and receiver for transmitting and receiving data from the remote system. In still other embodiments, the pest control device may be configured to be hardwired to a communication network via a cable.

The electrical components 84 of the control device 14 may also include visual indicators such as, for example, light emitting diodes (LEDs) 168, which may be activated to indicate the operational status of the device 14. For example, the LEDs may be used to indicate whether the device 14 is communicating with the remote system 16.

The electrical components 84 of the control device 14 also include a position/orientation sensor 170 configured to detect movement of the station 10. In the illustrative embodiment, the orientation sensor 170 is a 3-axis digital accelerometer such as, for example, the MMA8652, which is commercially available from Freescale. The sensor 170 detects movement of the control device 14 and transmits a signal indicative of that movement to the ECU 162, as described in greater detail below.

In other embodiments, the position sensor 170 may be a Hall-Effect sensor that detects the proximity of the sensor 170 (and hence the station 10) to a magnetic anchor secured to the ground or otherwise separated from the station 10. In such embodiments, movement of the station 10 relative to the magnetic anchor causes the sensor 170 to generate a signal indicative of that movement and transmit that signal to the ECU 162. When a magnetic anchor is incorporated into the frame 22, the Hall-Effect sensor may also be used to determine if the device 14 is properly positioned in the station 10.

As shown in FIG. 7, the pest control device 14 may also include a number of environmental sensors to provide information about the monitoring location and the pest control device 14. The environmental sensors may include a temperature sensor 172 configured to measure the temperature of the environment surrounding the station 10. In such embodiments, the temperature sensor may be a digital sensor such as, for example, the STLM75, which is commercially available from STMicroelectronics. The temperature sensor 172 is configured to take a temperature measurement and transmit a signal indicative of that measurement to the ECU 162.

It should be appreciated that in other embodiments the pest control device 14 may include other environmental sensors 174. Such sensors 174 may measure humidity, air quality, dampness, or other factors that may affect the operation of the control device 14, the status of the bait, and/or the state of the station 10.

As shown in FIG. 7, the control device 14 is powered by a local battery 176. In the illustrative embodiment, the battery 176 is a lithium thionyl chloride battery that is not replaceable. It should be appreciated that in other embodiments other battery types may be used. In still other embodiments, the control device 14 may utilize an external power source.

The control device 14 may also include a proximity sensor 178 configured to detect a magnetic source such as, for example, a magnetic wand that may be present during maintenance. In one embodiment, the proximity sensor 178 may bea Hall-Effect sensor that generates a signal to indicate the presence of the magnetic source and transmit that signal to the ECU 162. It should be appreciated that other embodiments may implement a different detection mechanism that includes additional or fewer components to detect the presence of rodents in the station 10.

Figure 11A:
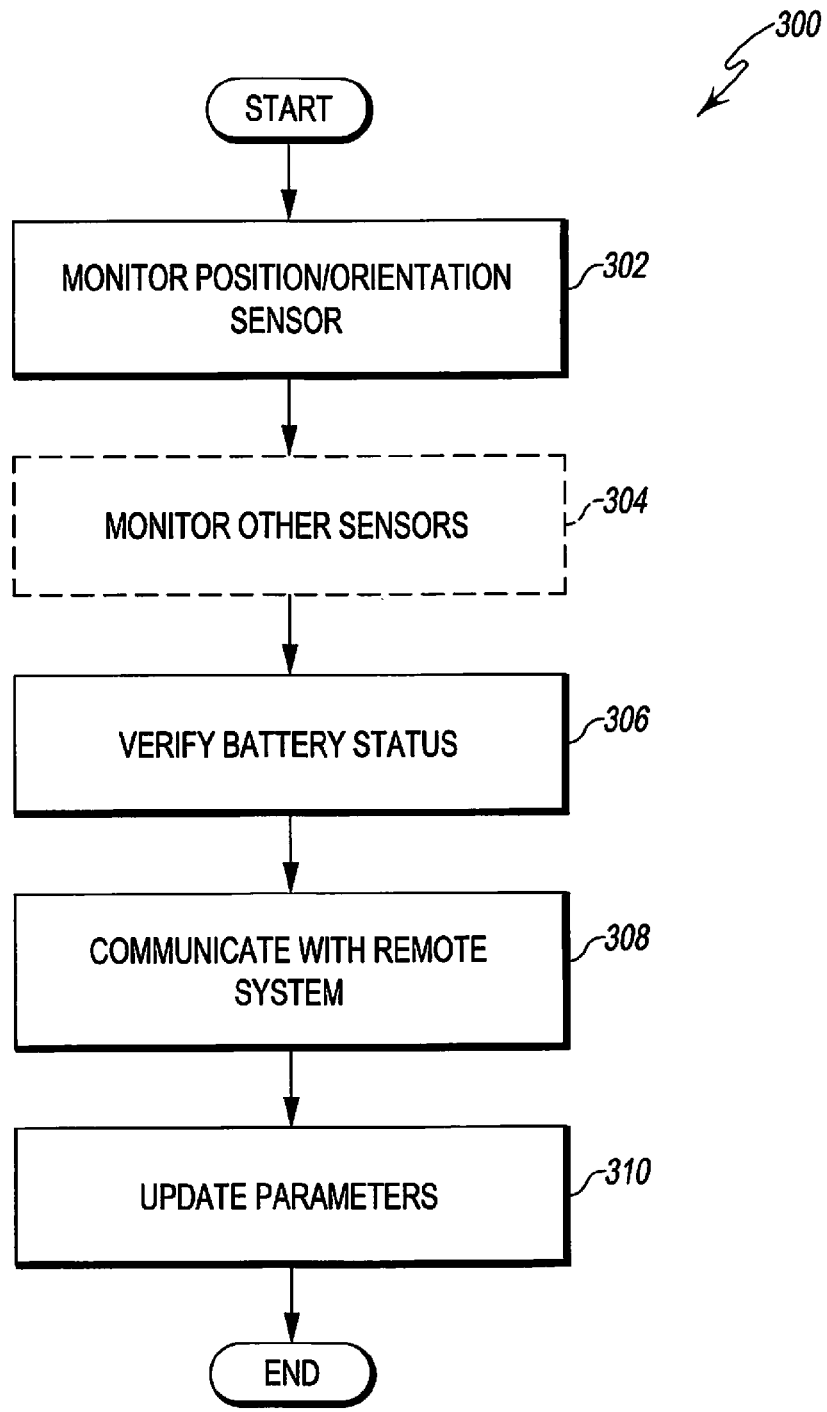
FIGS. 11A and 11B are simplified flow charts of a control routine of the pest control system of FIG. 1.

As described above, the electrical components 84 are connected to, and communicate with, the ECU 162, which is, in essence, the master computer responsible for interpreting electrical signals sent by sensors associated with the control device 14 and for activating or energizing electronically-controlled components associated with control device 14. For example, the ECU 162 is configured to control operation of the transceiver array 166. The ECU 162 also monitors various signals from the capacitive the sensors 170, 172, 174 and determines when various operations of the control device 14 should be performed. As will be described in more detail below with reference to FIGS. 11A-B, the ECU 162 is operable to control the components of the control device 14 such that the pest activity and other information about the station 10 are communicated to the remote system 16.

To do so, the ECU 162 includes a number of electronic components commonly associated with electronic units utilized in the control of electromechanical systems. For example, the ECU 162 includes, amongst other components customarily included in such devices, a processor such as a microprocessor 180 and a memory device 182 such as a programmable read-only memory device ("PROM") including erasable PROM's (EPROM's or EEPROM's). The memory device 182 is provided to store, amongst other things, instructions in the form of, for example, a software routine (or routines) which, when executed by the microprocessor 180, allows the ECU 162 to control operation of the control device 14.

The ECU 162 also includes an analog interface circuit 184. The analog interface circuit 184 converts the output signals from various sensors (e.g., the orientation sensor 170) into signals which are suitable for presentation to an input of the microprocessor 180. In particular, the analog interface circuit 184, by use of an analog-to-digital (A/D) converter (not shown) or the like, converts the analog signals generated by the sensors into digital signals for use by the microprocessor 180. It should be appreciated that the A/D converter may be embodied as a discrete device or number of devices, or may be integrated into the microprocessor 180. For those sensors of the control device 14 that generate a digital output signal, the analog interface circuit 184 may be bypassed.

Similarly, the analog interface circuit 184 converts signals from the microprocessor 180 into output signals which are suitable for presentation to the electrically-controlled components of the control device 14. In particular, the analog interface circuit 184, by use of a digital-to-analog (D/A) converter (not shown) or the like, converts the digital signals generated by the microprocessor 180 into analog signals. It should be appreciated that, similar to the A/D converter described above, the D/A converter may be embodied as a discrete device or number of devices, or may be integrated into the microprocessor 180. For those electronically-controlled components that operate on a digital input signal, the analog interface circuit 184 may be bypassed.

Thus, the ECU 162 may control the operation of the control device 14. In particular, the ECU 162 executes a routine including, amongst other things, a control scheme in which the ECU 162 monitors outputs of the sensors associated with the control device 14 to control the inputs to the electronically-controlled components associated therewith. To do so, the ECU 162 communicates with the sensors associated with the control device 14 to determine, amongst numerous other things, the temperature of the environment, movement of the device 14, and so forth. Armed with this data, the ECU 162 performs numerous calculations, either continuously or intermittently, including looking up values in preprogrammed tables, in order to execute algorithms to perform such functions as transmitting or receiving data from the remote system 16, etcetera. It should be appreciated that in other embodiments, the ECU may be implemented as field programmable gate array (FPGA) or other programmable logic device, a digital signal processor (DSP), an application specific integrated circuit (ASIC), or any other configuration that is designed to perform the functions described herein.

Figure 8:
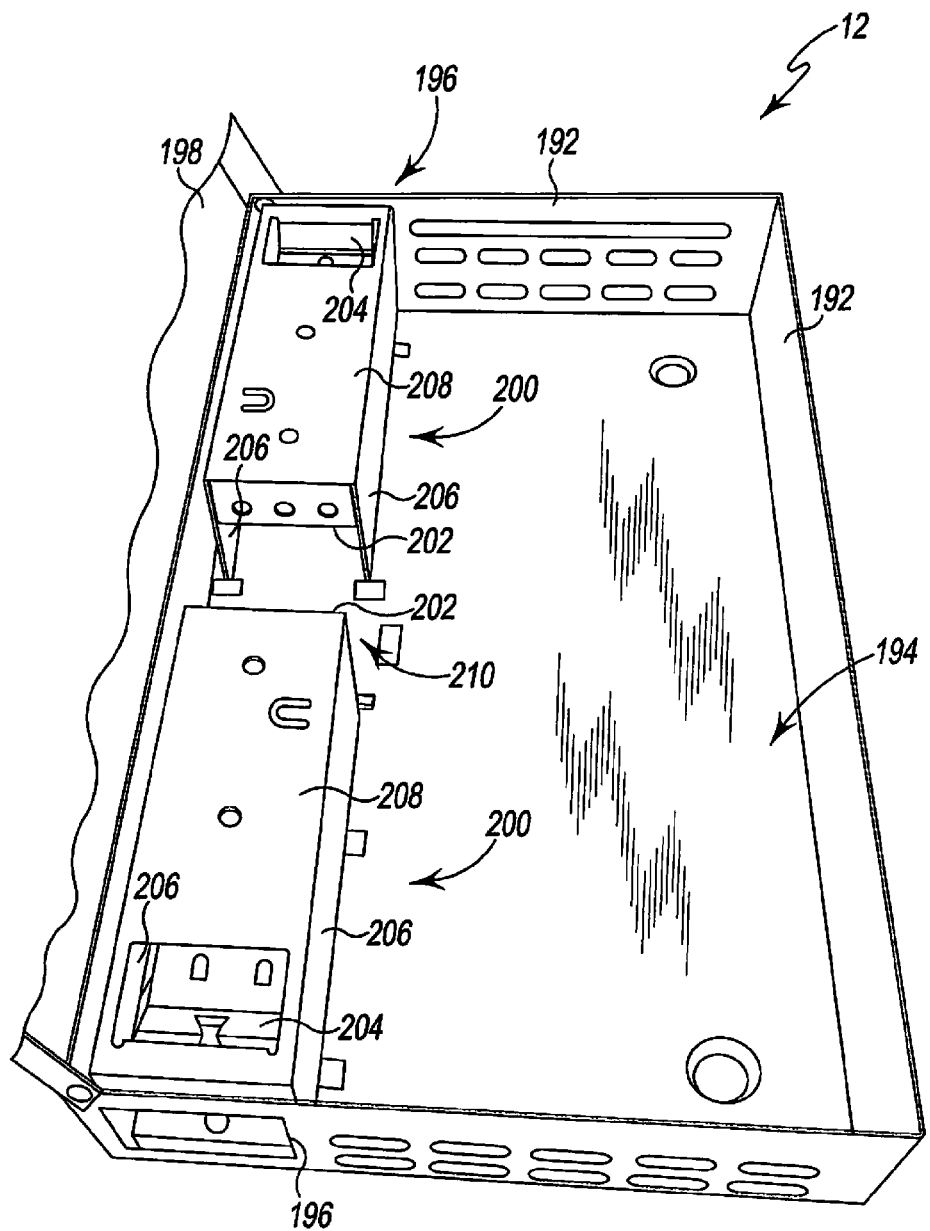
FIG. 8 is a perspective view of the station housing of the system of FIG. 1.

Referring now to FIG. 8, the housing 12 includes a base plate 190 and a plurality of outer walls 192 define an inner compartment 194. The pest control device 14 and the tray 20 are positioned in the compartment 194. In the illustrative embodiment, a pest may enter the station 10 through an opening 196 defined in each opposite wall 192. The housing 12 is illustratively formed from a hard, durable metallic material, but, in other embodiments, it may be formed from any environmentally resistant material such as, for example, plastic.

The housing 12 also includes a cover 198 that is hinged to the one of the outer walls 192. The cover 198 is illustratively formed from the same material as the housing. The cover 198 is movable between the closed position shown in FIG. 1 and an open position shown in FIGS. 2 and 8 in which the compartment 194, and hence the control device 14 and tray 20, are accessible for maintenance or other servicing. It should be appreciated that in other embodiments the cover may be removable from the housing. In still other embodiments, the cover may be omitted from the housing 12.

As shown in FIG. 8, the housing 12 includes a pair of entry ports 200 that extend inwardly from the openings 196. Each entry port 200 includes a passageway 202 through which a rodent may pass to enter the compartment 194 and a moveable tongue 204 configured to prevent rodent from exiting the compartment 194 through either passageway 202. In the illustrative embodiment, each port 200 includes side walls 206 and upper wall 208 that cooperate to define the passageway 202. Each passageway 202 opens into a channel 210 defined between the side walls 206.

Figure 9:
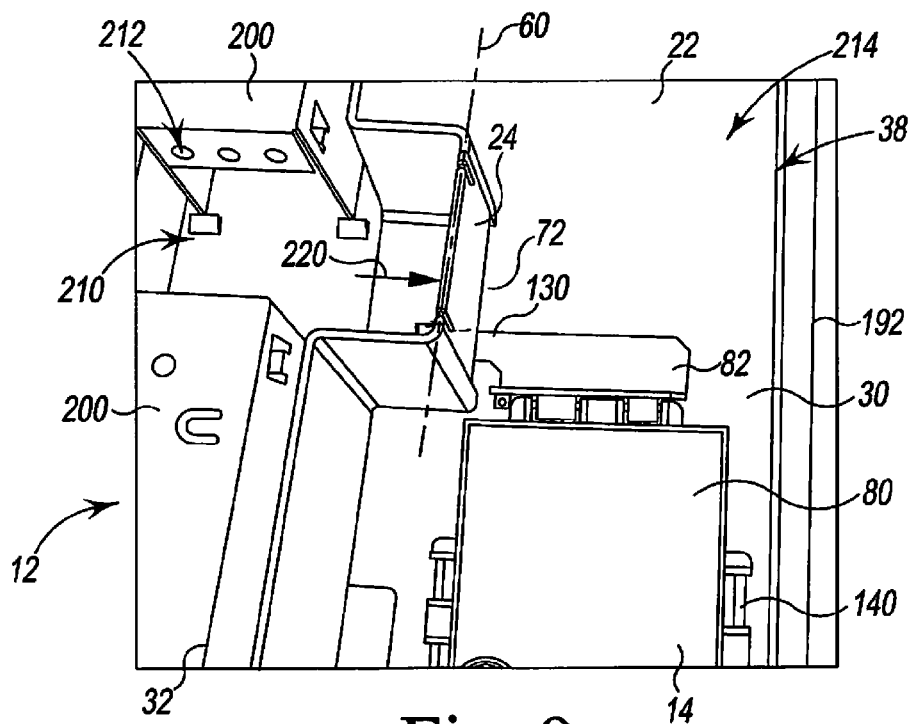
FIG. 9 is a perspective view showing the pest control device in an armed position.

In use, a pest control operator may deploy the housing 12 in, for example, a building to monitor pest activity. The pest control operator may open the cover 198 of the housing 12 to gain access to the inner compartment 194. The pest control operator may then place the modular tray 20 including the frame 22 and the pest control device 14 in the inner compartment 194. In embodiments with no housing, the modular tray 20 may be deployed in the building with the pest control device 14. As shown in FIG. 9, the pest control device 14 is mounted in the frame 22 with the support posts 140 positioned in the slots 150 of the outer casing 80 of the control device 14. The pest control operator may also close the panel 24 to cover the aperture 50 and position in the engagement tab 130 of the support plate 82 in the elongated slot 72 defined below the panel 24 of the tray 20.

When the engagement tab 130 is positioned in the elongated slot 72 and the panel is closed, the pest control device 14 is in an armed position. As shown in FIG. 9, the outer casing 80 is angled relative to the base wall 30 of the frame 22 such that the end wall 88 of the casing 80 engages the base wall 30, while the other end wall 86 is lifted off the base wall 30 by the support plate 82. As described in greater detail below, the pest control device 14 is moved to a "tripped" position when a rodent attempts to gain access to the frame's chamber 38 through the aperture 50 of the frame 22.

When the tray 20 is properly positioned in the compartment 194, the aperture 50 defined in the frame 22 is aligned with the channel 210 of the housing 12, and the outer walls 192 of the housing 12 enclose the open side of the frame's chamber 38. Additionally, the side wall 32 cooperates with the ports 200 to divide the inner compartment 194 into two sub-compartments. The entry sub-compartment 212 illustratively includes the channel 210 and the ports 200; the other sub-compartment 214 include the frame's chamber 38 and the pest control device 14 positioned therein. When the cover 198 is closed, a rodent or other pest may pass from the entry sub-compartment 212 to the other sub-compartment 214 only through the aperture 50 of the frame 22. The pest control operator may therefore position any bait in the sub-compartment 214 (and hence in the chamber 38 of the frame 22) to encourage rodents to attempt to enter the sub-compartment 214.

To gain access to the sub-compartment 214 and therefore the chamber 38 of the frame 22, a rodent or other pest may press on the outer surface of the moveable panel 24. In the illustrative embodiment, the panel 24 includes a recess 74 into which a rodent may place its nose to push the panel 24 in the direction indicated by arrow 220 in FIG. 9. When sufficient force is applied, the moveable panel 24 is pivoted about the axis 60.

Figure 10:
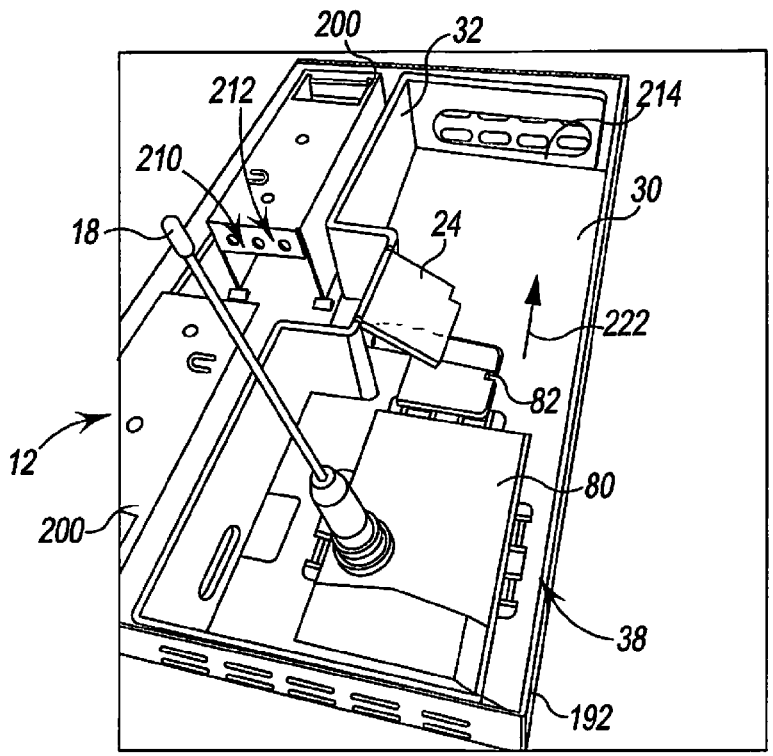
FIG. 10 is a view similar to FIG. 9 showing the pest control device in a tripped position.

As the panel 24 is pivoted about the axis 60, the elongated slot 72 is widened and the engagement tab 130 of the support plate 82 is permitted to slide along the frame 22 in the direction indicated by arrow 222 in FIG. 10. As the support plate 82 slides, the outer casing 80 of the pest control device 14 pivots downward to position in the pest control device 14 in the "tripped" position" shown in FIG. 10. In the illustrative embodiment, the end wall 86 of the pest control device 14 placed in contact with the base wall 30 in the tripped position. As described in greater detail below, the pest control device 14 is configured to register the movement of the pest control device 14 from the armed position to the tripped position and inform the remote system 16.

To conserve battery power, the ECU 162 is configured to enter a reduced power mode between operations. In the illustrative embodiment, the ECU 162 is configured to exit the reduced power mode every 100 milliseconds and execute a control routine similar to the control routine 300 illustrated in FIGS. 11A-B. It should be appreciated that while the operation blocks of the routine 300 are shown in sequence, the ECU 162 may perform one or more of the operations depicted therein simultaneously or in an order different from that shown in FIGS. 11A-B. It should also be appreciated that in other embodiments one or more of the operation blocks may be omitted.

In the illustrative routine, the routine 300 begins with block 302 in which the ECU 162 monitors data generated by the position or orientation sensor 170 and take a reading of the (x, y, z) coordinates of the position sensor 170 (and hence outer casing) at predetermined time intervals. When the ECU 162 has taken a predetermined number of readings, the ECU 162 may process the sensor data to determine whether the pest control device is stable and determine whether the movement of the pest control device exceeds a predetermined threshold.

Figure 11B:
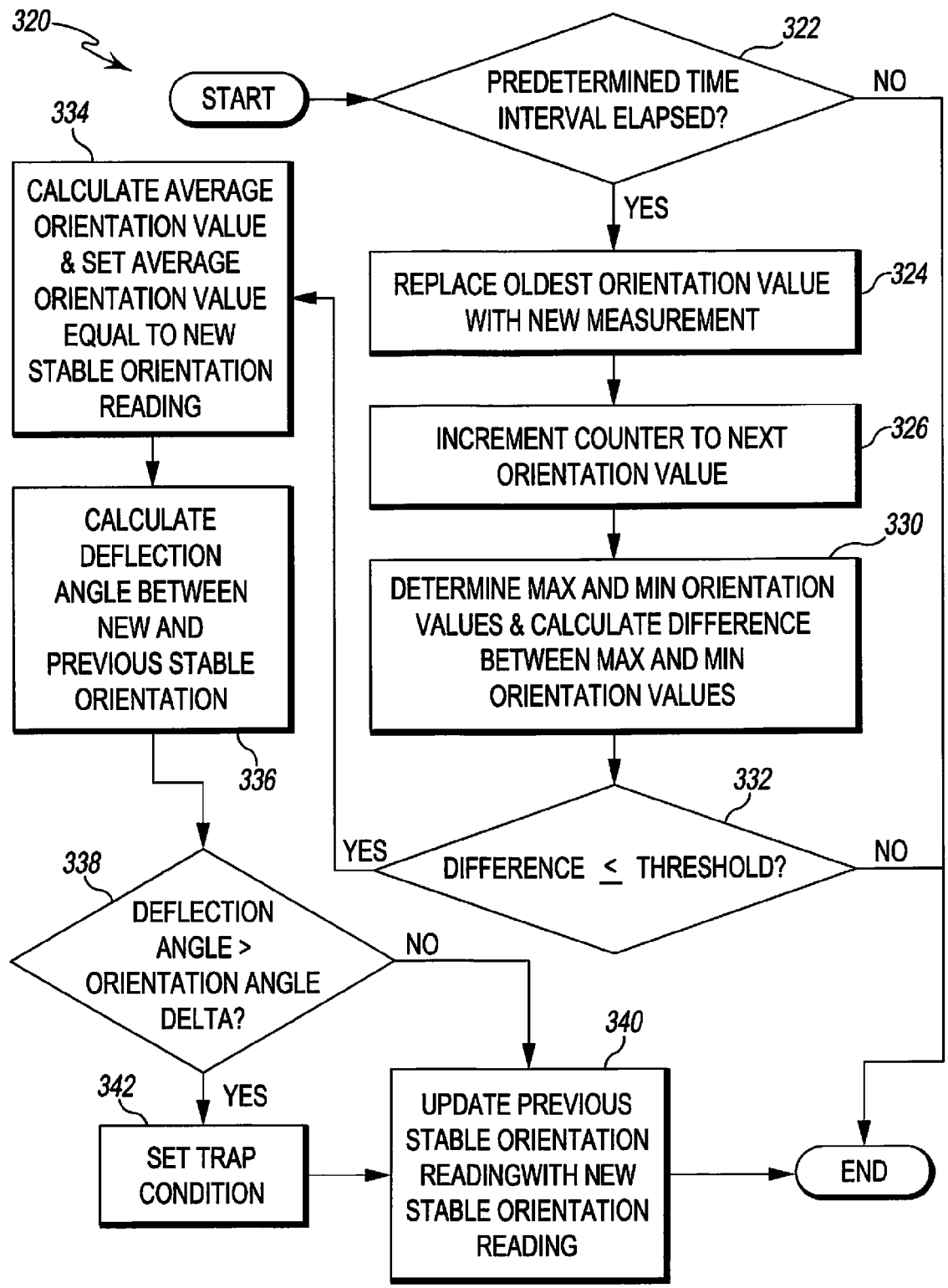

In block 302, the ECU may utilize a sub-routine such as, for example, sub-routine 320 shown in FIG. 11B, to monitor the sensor orientation/position. The sub-routine 320 begins in block 322 in which the ECU 162 determines whether a predetermined time interval has elapsed since the ECU 162 stored its last reading of the data of sensor 170. If the ECU 162 determines that the predetermined time interval has not yet been elapsed, the sub-routine 320 ends. If the ECU 162 determines that the predetermined time interval has elapsed, the sub-routine 320 proceeds to block 324. It should be appreciated that the predetermined time interval may be programmable and may be set based on the nature of the rodent and environment surrounding the pest control device 14. The illustrative embodiment, the predetermined time interval is 60 seconds.

In block 324, the ECU 162 monitors and records the (x, y, z) coordinates included in the position data generated by the sensor 170. In the illustrative embodiment, the (x, y, z) coordinates form an orientation value that indicates the orientation or position of the outer casing of the pest control device. In the sub-routine 320, the ECU 162 identifies the oldest stored orientation value (i.e., the oldest reading of (x, y, z) coordinates stored in memory) and replaces the oldest orientation value with the new (x, y, z) coordinates of the current reading. Illustratively, the ECU 162 stores only 8 sets of (x, y, z) coordinates, and the new (x, y, z) coordinates of the current reading replace one of those sets. It should be appreciated that in other embodiments the ECU may be configured to store additional or fewer sets of (x, y, z) coordinates (i.e., additional orientations values).

In the illustrative embodiment, a counter is used to index the stored (x, y, z) coordinates so that the ECU 162 may identify which set is the oldest set. At the conclusion of block 324, the sub-routine 320 may advance to block 326 in which the counter is incremented to correspond to the next stored set of (x, y, z) coordinates, which is now the oldest set of (x, y, z) coordinates in memory. It should be appreciated that other software tools may be used to identify the oldest set of (x, y, z) coordinates. The sub-routine 320 may advance to block 330.

When the sub-routine 320 advances to block 330, the ECU 162 processes the 8 sets of (x, y, z) coordinates to determine the maximum (x_max, y_max, z_max) and minimum (x_min, y_min, z_min) values for each of the x, y, and z coordinates of the 8 sets of (x, y, z) coordinates stored in memory. The ECU 162 may then use the maximum and minimum values for each of the x, y, and z coordinates in block 332.

In block 332, the ECU 162 determines whether the pest control device was in a stable orientation or stable position over the predetermined number of sensor readings. To do so, the ECU 162 calculates the differences between the maximum of each axis (x_max, y_max, z_max) and minimum of each axis (x_min, y_min, z_min) values for each of the x, y, and z coordinates. The maximum of each axis is compared individually against a programmable threshold for that axis. If all of the differences between the maximum and minimum values of the x, y, and z coordinates are less than or equal to the corresponding programmable thresholds (x_threshold, y_threshold, z_threshold), the sub-routine 320 may advance to block 334. If any one of the differences is greater than the corresponding programmable thresholds, the sub-routine 320 ends.

The programmable thresholds used in block 332 are set based on, among other things, the nature of the rodent and environment surrounding the pest control device 14. Ideally, with no physical movement of the outer casing 80, the differences between the maximum and minimum values of the x, y, and z coordinates should be at or near zero. However, disruptions from environmental factors, including wind and vibration, may cause the outer casing 80 to move. The programmable thresholds may be set higher than zero to permit movement of the casing 80 caused by wind and/or vibration. In the illustrative embodiment, each programmable threshold for the x, y, z coordinates (x_threshold, y_threshold, z_threshold) is set to 50 units, where each unit represents $1/1024$th of the force of gravity.

In block 334, the ECU 162 calculates average values for the x, y, and z coordinates recorded during the predetermined number of sensor readings. In other words, the ECU 162 calculates average x, y, and z coordinate values taken during the previous 8 sensor readings. The ECU 162 then stores the average x, y, and z coordinate values as new stable orientation values, the ECU 162 calculates the deflection angle between the new stable orientation values and the previous stable orientation values in block 336. To do so, the ECU 162 recalls from memory the previous stable orientation values $B_x$, $B_y$, and $B_z$. The ECU 162 may then calculate a deflection angle between the new and previous stable orientations using Equation (1) below.

$$DeflectionAngle = \cos^{-1}\left(\frac{(A_X * B_X) + (A_Y * B_Y) + (A_Z * B_Z)}{\sqrt{(A_X^2 + A_Y^2 + A_Z^2)*(B_X^2 + B_Y^2 + B_Z^2)}}\right) \quad (1)$$

$A_x$, $A_y$, $A_z$ are the coordinates of new stable orientation, and $B_x$, $B_y$, $B_z$ are the coordinates of previous stable orientation.

Subsequent to calculating the deflection angle between the new and previous stable orientations, the ECU 162 proceeds to block 338 in which the ECU 162 determines whether the calculated deflection angle is greater than a predetermined angular threshold. In the illustrative embodiment, the predetermined angular threshold is equal to 2.5 degrees, which is a predetermined minimum deflection angle to prevent false positive readings by eliminating insignificant changes in orientation caused by the environment surrounding. It should be appreciated that in other embodiments the predetermined angular threshold may be different from 2.5 degrees.

If the ECU 162 determines that the deflection angle is less than or equal to the predetermined angular threshold, the ECU 162 concludes that the orientation change in the pest control device 14 is insignificant and may proceed to block 340. In block 340, the ECU 162 updates the previous stable orientation readings $B_x$, $B_y$, and $B_z$ with the new stable orientation readings $A_x$, $A_y$, and $A_z$ before the sub-routine 320 ends.

If the ECU 162 determines that the deflection angle is greater than the predetermined angular threshold, the sub-routine 320 advances to block 342. In block 342, the ECU 162 sends a message to the system 16 to inform the system 16 that the deflection angle exceeded the predetermined angular threshold. The system 16 may then use that information to determine the status of the station 10 and inform the operator, as described above in regard to FIG. 19. For example, during an initial set up of the pest control station when some movements of the pest control device 14 are expected due to the human activities, the system 16 sets a default status of the station 10 as "Tripped."

When the station 10 is properly positioned with the pest control device 14 positioned in the armed position shown in, for example, FIG. 9, and is stable, the ECU 162 stores an initial orientation of the pest control device and sends the message to the system 16 that the deflection angle exceeded the predetermined angular threshold. The system 16 then updates the status of the station 10 to "Armed." Subsequently, when the system 16 receives a message that the deflection angle exceeded the predetermined angular threshold (i.e., the panel 24 has been moved and the pest control device 14 moved to the tripped position shown in FIG. 10), the system 16 updates the status of the station 10 to "Tripped" and alerts the operator that the station 10 has been tripped. The sub-routine 320 may then advance to block 340 in which the ECU 162 updates the previous stable orientation readings $B_x$, $B_y$, and $B_z$ with the new stable orientation readings $A_x$, $A_y$, and $A_z$ before the sub-routine 320 ends.

At any point that the sub-routine 320 ends, the routine 300 may cause the ECU 162 to advance to block 304 in which the ECU 162 monitors any other sensors, including, for example, a temperature sensor. To do so, the ECU 162 accesses the data from the sensor and stores a value in memory. The routine 300 may then advance to block 306.

In block 306, the ECU 162 samples the voltage of the battery 176 using the analog interface circuit 184. The measured voltage is then compared to thresholds stored in memory using an algorithm to determine the approximate state of the charge of the battery 176. The state of the charge may then be stored in memory. The routine 300 may then advance to block 308.

In block 308, the pest control device 14 communicates with the remote system 16. The remote system 16 includes communications middleware, database, and application software and may be located on site with the pest control device 14 or off site. A range extender may be used to extend a range of a wireless network to transmit data received from the pest control device. The remote system 16 may also include a base station, which may include a transceiver that receives data directly from the pest control device or indirectly via the range extender and transmits data to a network-based utility via a cellular wireless network. The base station may also receive data from the network-based utility and transmit that data to the pest control device directly or indirectly via the range extender. The network-based utility may be further integrated with different interfaces, such as a management portal, mobile service interfaces, or billing interface. Through these interfaces, the data may be further processed, analyzed, stored, or further transmitted to web or mobile services. One example of a network-based utility is MeshVista®, which is commercially available by Mesh Systems™.

To transmit its data to the remote system 16, the ECU 162 energizes the transceiver array 166 to establish contact with the remote system 16 via the local area network (LAN). The transmitted data may include, among other things, the recorded pest events, service events, temperature measurements, records of movement, the state of the charge of the battery 176, and so forth. The pest control device 14 may also transmit an indication of the health of the LAN communications infrastructure.

The remote system 16 may then interpret the data and transmit updated parameters back to the control device 14. The remote system 16 may update, for example, the Pest Value threshold if a number of false positives have been logged at the control device 14. The updated parameters may include the programmable constant Kf, the Human Value threshold, the Pest Value threshold, and the software counter limit for each pad. Additionally, the remote system 16 may change the predetermined sequence of pad contacts used to indicate a service event. The ECU 162 updates the parameters stored in memory in block 310 before returning to the reduced power mode.

Figure 13:
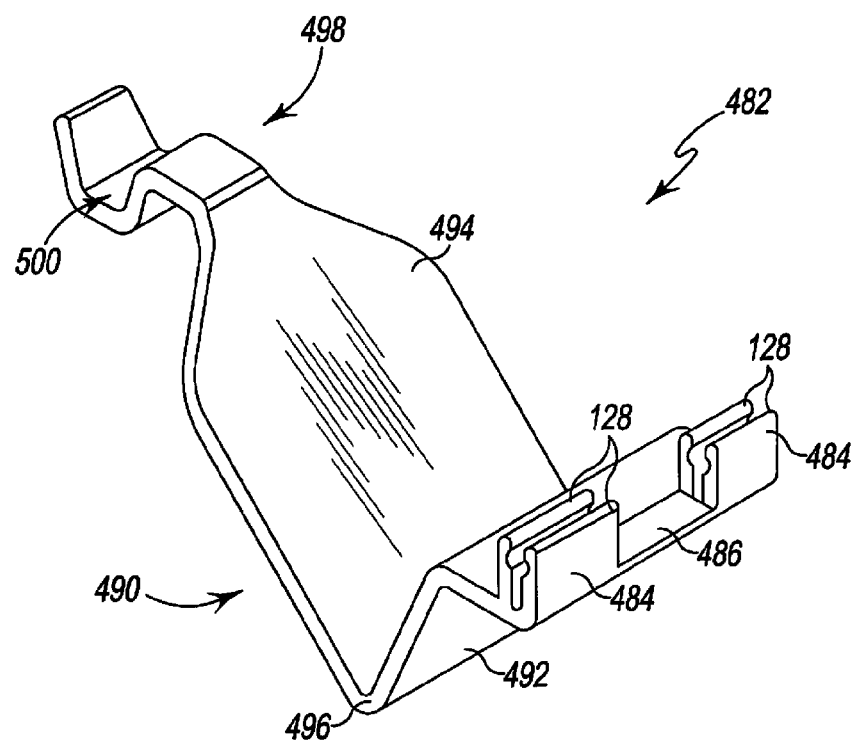
FIG. 13 is a perspective view of another embodiment of a support plate of a pest control device.
Figure 14:
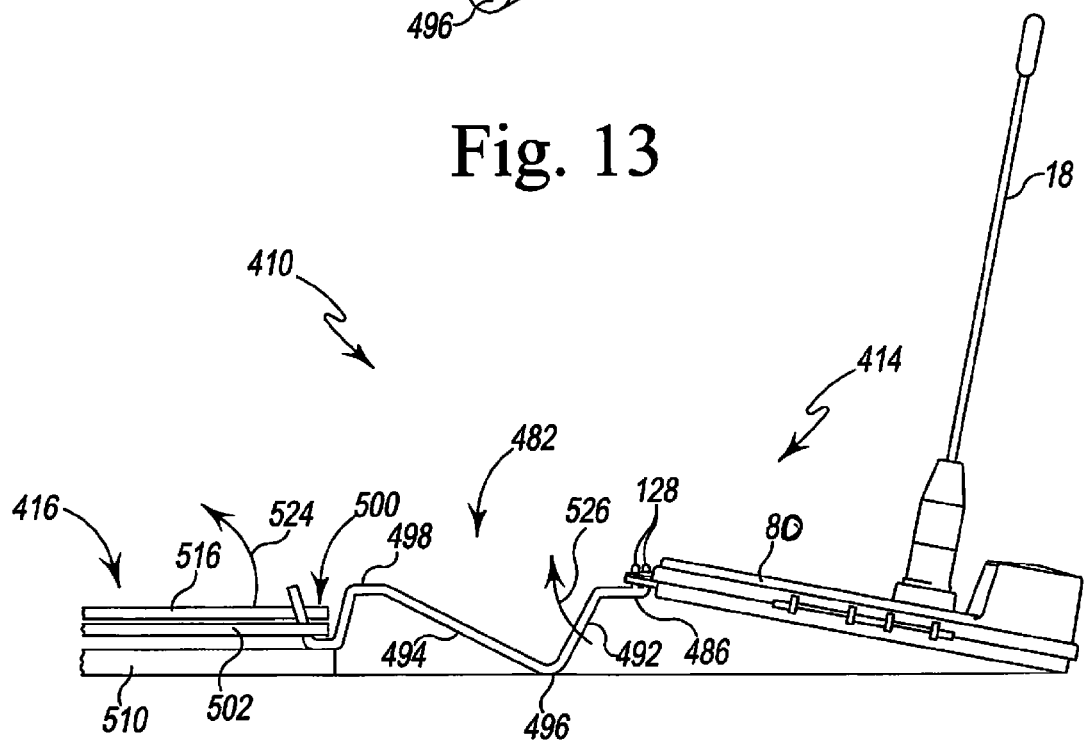
FIG. 14 is an elevation view showing a pest control device with the support plate of FIG. 13 engaged with a pest trap.

Referring now to FIGS. 13-14, a pest control station 410 is shown with another embodiment of a pest control device 414 and a pest trap device 416. The embodiment of FIGS. 13-14 includes many of the same features described above in regard to FIGS. 1-12. The same reference numbers are used in FIGS. 13-14 to identify features that are the same or similar to those described above in regard to FIGS. 1-12. As shown in FIG. 14, the pest control device 414 may be coupled to a snap-type rodent trap 416 that detains and/or exterminates the rodent. In the illustrative embodiment, the snap-type rodent trap is a typical snap-type trap such as, for example, the Victor Metal Pedal Rat Traps—M200. In operation, the pest control device 414 includes an outer casing 80 and the other components positioned within the outer casing 80 including, for example, the position or orientation sensor 170 that is operable to detect movement of the pest control device 414 and report that movement of the pest control device 314 to a remote system 16 wirelessly via an antenna 18 to provide an indication of whether the trap 416 has been activated.

As shown in FIG. 13, the pest control device 414 includes a support plate 482 that is attached to the casing 80. The support plate 482 includes a clip 484 extending from an arm 486 that is configured to engage a rod 110 of the outer casing 80 to secure the support plate 82 to the outer casing 80. In the illustrative embodiment, the clip 484 includes teeth 128 that engage the rod 110 such that the support plate 482 is hinged to the pest control device 414 and may pivot relative to the outer casing 80.

The support plate 482 includes a v-shaped leg 490 that has a rear section 492 extending at angle relative to the arm 486. A forward section 494 is connected to the rear section 492 at the apex 496 of the leg 490 and extends at an angle relative to the rear section 492. The support plate 482 also includes a foot 498 that extends from the end of the leg 490. As shown in FIGS. 13-14, the foot 498 includes a groove 500 sized to receive a portion of the jaw 502 of the rodent trap 416.

As shown in FIG. 14, the snap-type rodent trap 416 can be placed in an "armed" condition. The trap 416 includes a base 510 and a generally U-shaped jaw 502 that is pivotally coupled to a spring (not shown). In the "aimed" condition, the jaw is held in place by a trap pin 516 such that the jaw 502 is adjacent to the pest control device 414, as shown in FIG. 14. In this configuration, if a rodent applies sufficient downward pressure on a bait plate (not shown), the trap pin 516 is displaced, and the jaw 502 snaps over in the direction indicated by arrow 524 to pin the rodent between the jaw 502 and the base 510. In that position, the trap 416 is in a "Tripped" condition.

During the transition from the "Armed" condition to "Tripped" condition, the leg 500 of the support plate 482 is released from the jaw 502. The weight of the pest control device 414 causes the support plate 482 to pivot about the apex 496 of the leg 490 in the direction indicated by arrow 526. The outer casing 80 drops to the ground level. As described in greater detail below, the position sensor 170 monitors this orientation or position of the outer casing 80 and generates (x, y, z) orientation data that may be used to detect movement of the outer casing 80. The signals are then analyzed by the system 16 to determine the condition of the trap 416.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected. For example, it should be appreciated that the modular trays such as those shown and described above may be deployed without a housing. It should also be appreciated that the pest control device may be attached directly to the moveable panel of the modular tray such that the pest control device is pivoted with the panel.

There is a plurality of advantages of the present disclosure arising from the various features of the method, apparatus, and system described herein. It will be noted that alternative embodiments of the method, apparatus, and system of the present disclosure may not include all of the features described yet still benefit from at least some of the advantages of such features. Those of ordinary skill in the art may readily devise their own implementations of the method, apparatus, and system that incorporate one or more of the features of the present invention and fall within the spirit and scope of the present disclosure as defined by the appended claims.

What is claimed is:

1. A pest control system comprising:
    a frame configured to be removeably positioned in a pest control station,
    a panel pivotally coupled to the frame, the panel being moveable relative to the frame between a first position and a second position, and
    a pest control device positioned in the frame, the pest control device including an outer casing, a support plate pivotally coupled to the outer casing, an orientation sensor positioned in the outer casing, the orientation sensor being operable to generate a plurality of electrical output signals indicative of the orientation of the pest control device, and an electronic controller operable to receive the electrical output signals,
    wherein when the panel is in the first position, the support plate is maintained in a support position such that the pest control device is in a first orientation, and when the panel is in the second position, the support plate is released from the support position and the pest control device is in a second orientation different from the first orientation,
    wherein the electronic controller is operable to (i) detect movement of the pest control device from the first orientation to the second orientation based on the electrical output signals of the orientation sensor and (ii) record an event indicative of a presence of a pest when the electronic controller detects the movement of the pest control device from the first orientation to the second orientation,
    wherein the support plate includes a leg that is pivotally coupled to the outer casing and a foot extending outwardly from the leg, the support plate being moveable from the support position in which the foot is positioned in a slot defined between a bottom edge of the panel and a base wall of the frame, below the panel,
    wherein the frame includes a side wall and an aperture that is defined in the side wall, and
    wherein the panel is positioned in the aperture, extends generally parallel to the side wall when the panel is in the first position, the slot having a width between the bottom edge of the panel and the base wall of the frame in the first position, and the panel is angled relative to the side wall with the slot widened relative to its width in the first position when the panel is in the second position.

2. The pest control system of claim 1, further comprising a housing having (i) a compartment sized to receive the frame, the panel, and the pest control device and (ii) an opening sized to permit a pest to enter the compartment.

3. The pest control system of claim 2, wherein:
    the side wall is positioned between the opening in the housing and the pest control device, and the aperture is sized to permit the pest to pass through the side wall.

4. The pest control system of claim 1, wherein the pest control device is secured to the frame.

5. The pest control system of claim 4, wherein the frame includes a vertically-extending post, and the pest control device includes a slot sized to receive the vertically-extending post.

6. The pest control system of claim 4, wherein the frame includes a bracket positioned over the pest control device.

7. The pest control system of claim 1, wherein the frame further includes a base wall, the side wall extending upwardly from the base wall, and
    the slot is defined between the panel and the base wall.

8. The pest control system of claim 7, wherein the panel covers the aperture of the frame when in the first position and the aperture is at least partially uncovered when the panel is in the second position.

9. The pest control system of claim 1, wherein the pest control device further includes a transceiver operable to transmit a signal after the controller records the event indicative of the presence of the pest.

10. A pest control system comprising:
    a frame configured to be removeably positioned in a pest control station housing,
    a panel pivotally coupled to the frame, the panel being moveable relative to the frame between a first position and a second position, and
    a pest control device positioned in the frame, the pest control device including an outer casing, a support plate pivotally coupled to the outer casing, and an orientation sensor positioned in the outer casing, the orientation sensor being operable to generate a plurality of electrical output signals indicative of the orientation of the pest control device,
    wherein when the panel is in the first position, the support plate is maintained in a support position such that the pest control device is in a first orientation, and when the panel is in the second position, the support plate is released from the support position and the pest control device is in a second orientation different from the first orientation,
    wherein the support plate being moveable from the support position in which a portion of the support plate is positioned in a slot defined between a bottom edge of the panel and a base wall of the frame, below the panel,
    wherein the frame includes a side wall and an aperture that is defined in the side wall, and
    wherein the panel is positioned in the aperture, extends generally parallel to the side wall when the panel is in the first position, the slot having a width between the bottom edge of the panel and the base wall of the frame in the first position, and the panel is angled relative to the side wall with the slot widened relative to its width in the first position when the panel is in the second position.

11. The pest control system of claim 10, wherein:
    the side wall is positioned between an opening in the housing and the pest control device, and the aperture is sized to permit a pest to pass through the side wall.

* * * * *